Feb. 13, 1968    P. F. KIENAST    3,369,068
ELECTRODE FOR FURNACE APPLICATIONS PROVIDING STEAM
BLEEDING TO PROTECT THE WALL OF THE FURNACE
Filed March 2, 1967
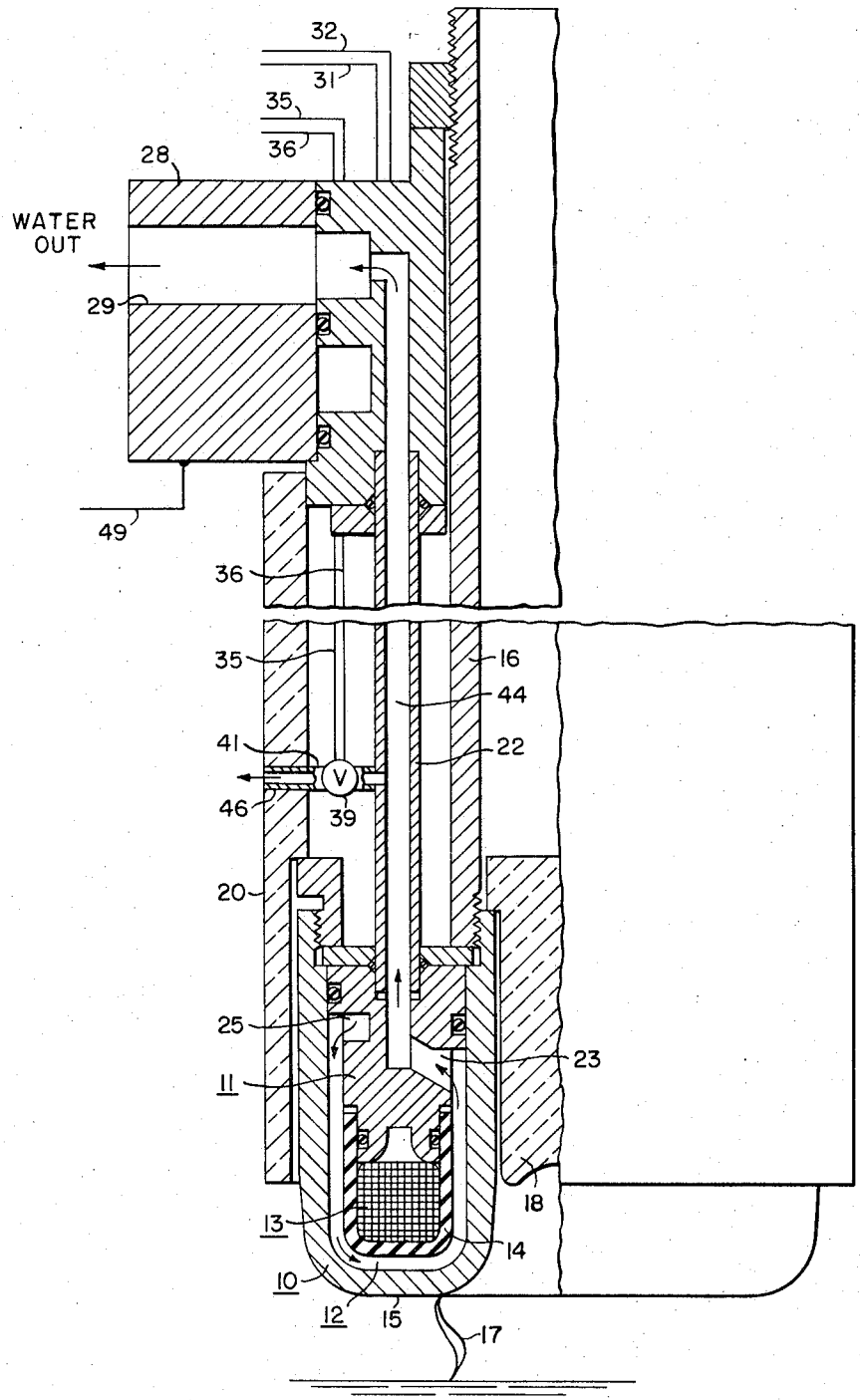
WITNESSES
INVENTOR
Peter F. Kienast
BY
ATTORNEY United States Patent Office 3,369,068
Patented Feb. 13, 1968

3,369,068
ELECTRODE FOR FURNACE APPLICATIONS PROVIDING STEAM BLEEDING TO PROTECT THE WALL OF THE FURNACE
Peter F. Kienast, Pittsburgh, Pa., assignor to Westinghouse Electric Corporation, Pittsburgh, Pa., a corporation of Pennsylvania
Filed Mar. 2, 1967, Ser. No. 619,969
14 Claims. (Cl. 13—18)

ABSTRACT OF THE DISCLOSURE

An electrode of the type having a fluid cooled tip forming an arcing surface, and a body portion supporting the tip, has means forming two passageways through the body portion, one for conducting cool fluid to the tip, and the other for conducting relatively hot fluid from the tip where some of the heat flux in the metal of the tip has been transferred to the fluid. One or more conduits extending laterally through the electrode body communicate with the means forming the passageway for hot fluid, the laterally extending conduits opening into the space outside the electrode, where the fluid, usually water, is flash evaporated into steam. Electrically controlled valve means in the conduit(s) permits regulation of the fluid flow through the conduit(s).

Field of the invention

This invention relates to improvements in electrodes especially suitable for use in electric arc furnaces, and more particularly to an improved electrode employing fluid cooling in which a portion of the cooling fluid is bled into the furnace where it is flash evaporated into steam to protect the inside wall surface of the furnace.

Description of the prior art

One of the major problems of conventional carbon or graphite electrode arc furnaces is both the time and expense involved in relining the side walls of these furnaces. Experience has shown that the portions of the furnace lining directly exposed to bombardment by small molten metal particles and the hot spots in and around the arc erode and fracture rapidly, necessitating relining of the furnace.

Various schemes have been tried by arc furnace users to minimize erosion and to increase the life of the furnace linings. It has occurred to others heretofore to inject steam along the side wall of the furnace to increase the life of the furnace lining. However, heretofore it has been necessary to provide additional boiler equipment to provide the steam and to increase the complexity of the electrode and the electrode handling and positioning apparatus as a result of the necessity of providing steam conduit and so forth.

Summary of the invention

I have overcome the difficulties and limitations of the prior art by providing an electrode in which a cooling fluid is circulated through the electrode near the arcing surface to conduct heat flux away from the arcing surface, and also to cool a magnetic field producing coil located in the arcing end of the electrode, and I inject some of this fluid through a passageway or passageways in the wall or walls of the electrode into the furnace where the fluid is flash evaporated by the intense heat, and instantly becomes steam, the evaporation occurring along the side walls of the arc furnace.

The basic electrode design is described and claimed in the copending application of A. M. Bruning, for "Electric Arc Furnace and Non-Consumable Electrode Suitable for Use Therein," Ser. No. 407,332, filed Oct. 29, 1964, and assigned to the assignee of the instant invention. The aforementioned copending patent application discloses a non-consumable electrode with fluid cooled means forming an arcing surface, magnetic field producing means disposed in the means forming the arcing surface for setting up a magnetic field to rotate the arc, means for bringing cooling fluid to the arcing surface forming means and means for conducting fluid from the arcing surface forming means, and heat shield means for protecting the outside of the electrode from the intense heat of radiation and convection of the arc.

Brief description of the drawing

The single figure of the drawing shows an electrode, partially in cross-section and partially in side elevation, embodying my invention.

Description of the preferred embodiment

The electrode of my invention which is shown in the single drawing, in half cross-section, includes generally an annular cup-shaped member U-shaped in cross-section composed of copper or other material having high thermal conductivity and forming an arcing surface, this member being generally designated 10. It may be referred to herein as the electrode tip. Fluid channeling means generally designated 11, disposed inside of the U-shaped annular arcing surface forming means includes means forming a passageway or passageways for the flow of coloring fluid around the arcing surface forming means near the arcing surface 15 to which arc 17 occurs, this passageway being designated 12; a magnetic field producing coil generally designated 13 is disposed in a suitable housing composed of insulating material 14, which may be considered a part of the aforementioned fluid channeling means generally designated 11. Tip supporting means including a cylindrical supporting member generally designated 16 and composed of steel or other suitable material, the supporting member 16 having a threaded external surface at the lower end thereof, is in threaded engagement with the adjacent surface of the aforementioned tip or annular arcing surface forming means 10. In addition, the electrode includes a plug 18 composed of ceramic or other suitable material disposed in the annular opening in tip 10 and closing the bottom opening within the cylindrical member 16; an outer cylindrical heat shield member 20 composed of ceramic or other suitable material; conduit means, not shown, for bringing cooling fluid to the aforementioned fluid passageway 12 and other conduit means for conducting fluid from the passageway, the other conduit means for conducting fluid from the arcing surface forming means being shown at 22 communicating with a fluid header 23 which communicates with the aforementioned passageway 12. A fluid inlet header 25 is shown which it will be understood communicates with a fluid inlet conduit, not shown for convenience of illustration, the fluid inlet conduit being positioned if desired 180° from the fluid outlet conduit 22.

At the upper end of the electrode there is a head member generally designated 28, providing fluid inlets and fluid outlets, the fluid outlet being shown at 29, and having leads extending therefrom, leads 31 and 32 being connected to the aforementioned field coil 13 for energizing the same, and leads 35 and 36 being connected to a valve 39 which controls fluid flow through a conduit section 41, the conduit section 41 opening at one end into the passageway 44 in conduit 22, the other end of the conduit section 41 passing through a bore 46 in the ceramic heat shield 20. Lead 49 is connected to the aforementioned head member 28 which is composed of electrically conductive material and which makes electrical contact with the aforementioned cylindrical supporting member 16, which is also composed of electrically conducting material and which as stated hereinbefore is in threaded engagement with the electrode tip or arcing surface forming means 10, which is composed of electrically conductive material, thereby providing a path for bringing current to the tip 10 to produce the arc 17 to a surface of opposite polarity which may be the melt of a furnace or may be another electrode.

Leads 35 and 36, connected to valve 39, extend out of the upper end or head of the electrode and permit remote control of the setting of valve 39 to control the flow rate therethrough.

In operation, water exiting from the electrode by way of conduit 41, which water has already been heated by passing through passageway 12 where heat flux from the arcing surface was transferred to the water, is flash evaporated to steam against the furnace walls and increases the life of the furnace lining.

The foregoing written description and drawing it is understood are illustrative only and are not to be interpreted in a limiting sense.

I claim as my invention:

1. An electrode for use in an arc furnace comprising a supporting body, at least a portion of which is composed of electrically conductive material, means forming an arcing surface making electrical connection with said portion, the last-named means including means forming a fluid passageway for the flow of cooling fluid near the arcing surface, a field coil disposed within the arcing surface forming means, leads connected to the field coil for energizing the same, a supporting structure for the arcing surface forming means, fluid inlet means and fluid outlet means having a portion of each passing through the supporting body and a portion of each in the supporting structure and both communicating with the passageway in the arcing surface forming means, means for connecting the electrode body portion of conductive material to a source of potential to produce an arc from the arcing surface forming means to a surface of opposite polarity, and conduit means connected to one of the fluid inlet means and fluid outlet means for exhausting a portion of the fluid outside of said electrode at a selected position along the length of the electrode.

2. An electrode according to claim 1, additionally characterized as including valve means in the conduit means for varying the amount of fluid vented outside of the electrode.

3. An electrode according to claim 1 additionally characterized as having the conduit means communicating with the fluid outlet means whereby the fluid vented outside the electrode has been heated as a result of passing through the fluid passageway in the electrode tip.

4. An electrode according to claim 2, in which the valve means is additionally characterized as including an electrically controllable valve, and including in addition lead means passing through the electrode and exiting therefrom for controlling the operation of the valve.

5. An electrode according to claim 1, in which the fluid exhausted from the conduit means is additionally described as being flash evaporated to form steam at the wall of the frunace.

6. An electrode according to claim 5, in which the fluid in the conduit means is additionally described as being under pressure.

7. An electrode according to claim 6, in which the pressure is in the range of 100 p.s.i. to 300 p.s.i.

8. An electrode for use in a lined arc furnace, the electrode having means forming a fluid cooled arcing surface, fluid inlet and fluid outlet passageways through the electrode to the fluid cooled arcing surface, and means connected to one of said fluid passageways for exhausting at least a portion of the fluid therein outside the electrode toward the wall of the furnace where the fluid is flash evaporated to form steam which increases the life of the lining of the furnace.

9. Apparatus according to claim 1, in which the electrode is additionally characterized as having an annular passageway centrally therethrough and including in addition plug means composed of refractory material for closing the passageway at the arcing end of the electrode.

10. Electrode apparatus according to claim 8, in which the exhausting means is connected to the fluid outlet passageway.

11. An electrode apparatus according to claim 10, including in addition valve means in the exhausting means for adjusting the amount of fluid exhausted.

12. Electrode apparatus according to claim 11, in which the valve means is additionally characterized as being electrically controlled.

13. Electrode apparatus according to claim 8, in which the fluid is additionally characterized as being under pressure.

14. An electrode according to claim 8, in which the exhausting means is additionally characterized as comprising a plurality of radially extending conduits extending from said one passageway to the outside of the electrode.

References Cited

UNITED STATES PATENTS 3,209,059  9/1965  Gleitz et al. _____ 13—9
3,264,094  8/1966  Robinson _____ 75—11

BERNARD A. GILHEANY, *Primary Examiner.*

H. B. GILSON, *Assistant Examiner.*